United States Patent [19]

Stolzman

[11] Patent Number: 5,458,069

[45] Date of Patent: Oct. 17, 1995

[54] PLASTIC SKID AND METHOD OF MANUFACTURE

[76] Inventor: Michael D. Stolzman, 1188 Old Colony Rd., Lake Forest, Ill. 60045

[21] Appl. No.: 83,882

[22] Filed: Jun. 24, 1993

Related U.S. Application Data

[63] Continuation-in-part of Ser. No. 14,209, Feb. 5, 1993, abandoned.

[51] Int. Cl.⁶ ..................................................... B65D 19/12
[52] U.S. Cl. ............................................ 108/56.3; 108/901
[58] Field of Search ................................ 108/55.3, 56.1, 108/51.1, 56.3, 57.1, 901

[56] References Cited

U.S. PATENT DOCUMENTS

| | | | |
|---|---|---|---|
| 2,371,106 | 3/1945 | Lewis et al. | 108/57.1 |
| 3,651,769 | 3/1972 | Foley | 108/56.1 |
| 3,927,624 | 12/1975 | Hewson | 108/56.1 |
| 5,337,681 | 8/1994 | Schrage | 108/56.1 |

FOREIGN PATENT DOCUMENTS 3913677  10/1990  Germany ............................. 108/55.3

Primary Examiner—Kenneth J. Dorner
Assistant Examiner—Gerald A. Anderson
Attorney, Agent, or Firm—Wood, Phillips, VanSanten, Clark & Mortimer

[57] ABSTRACT

A plastic skid has longitudinally extending plastic rails and plastic cross members which extend transversely between the rails. The rails are injection molded and have an upper flange engageable with cargo to be supported on the skid and a lower flange engageable with a support surface. Each rail has a width characterized by the width of the upper flange and the lower flange. An integral longitudinal web extends between the upper flange and the lower flange of a rail. The web has a width which is substantially less than the width of the rail. An integral rib is provided on the web for enhancing the stiffness of the rail. The cross members are injection molded and have a tapered opening. A series of posts are integral with the rails and each engage a corresponding one of the cross member openings. The posts are ultrasonically welded to the cross members within the openings.

10 Claims, 9 Drawing Sheets

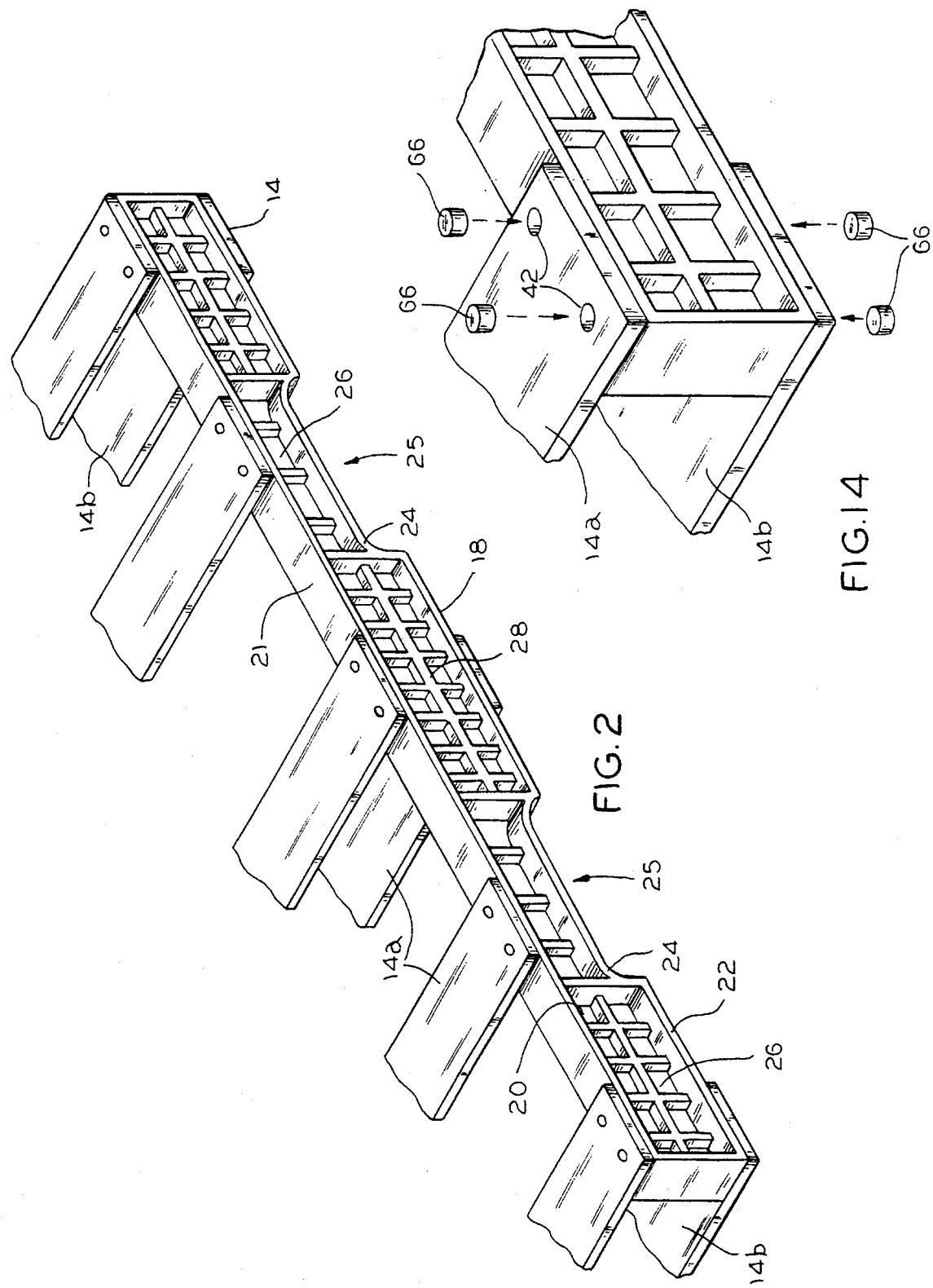

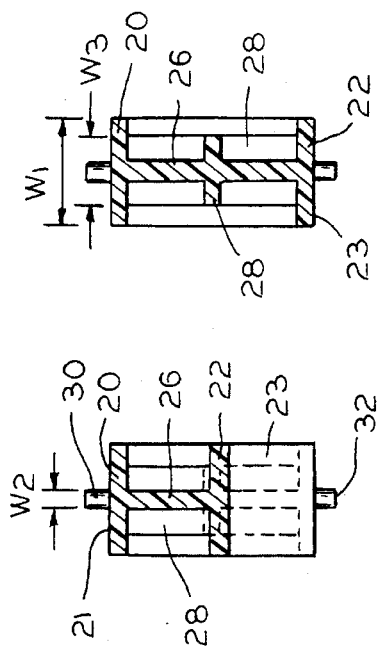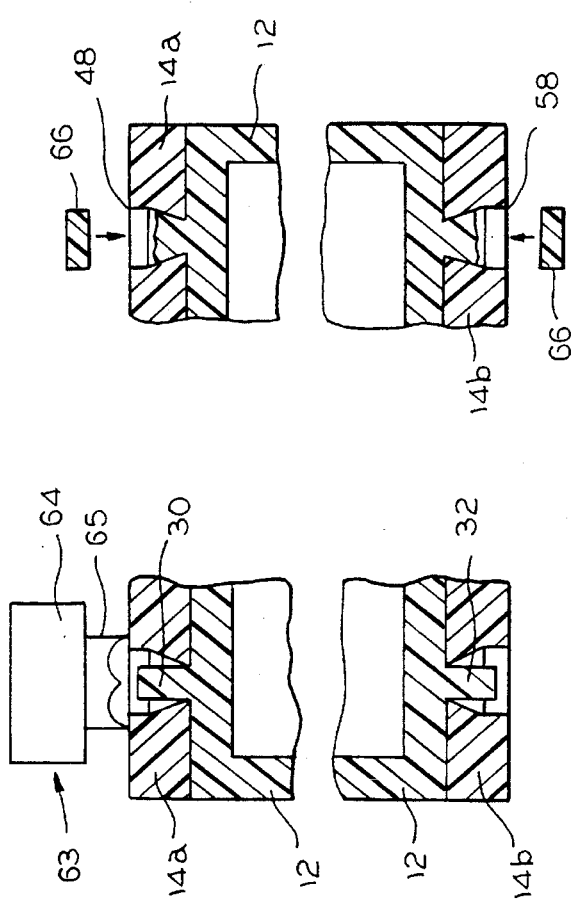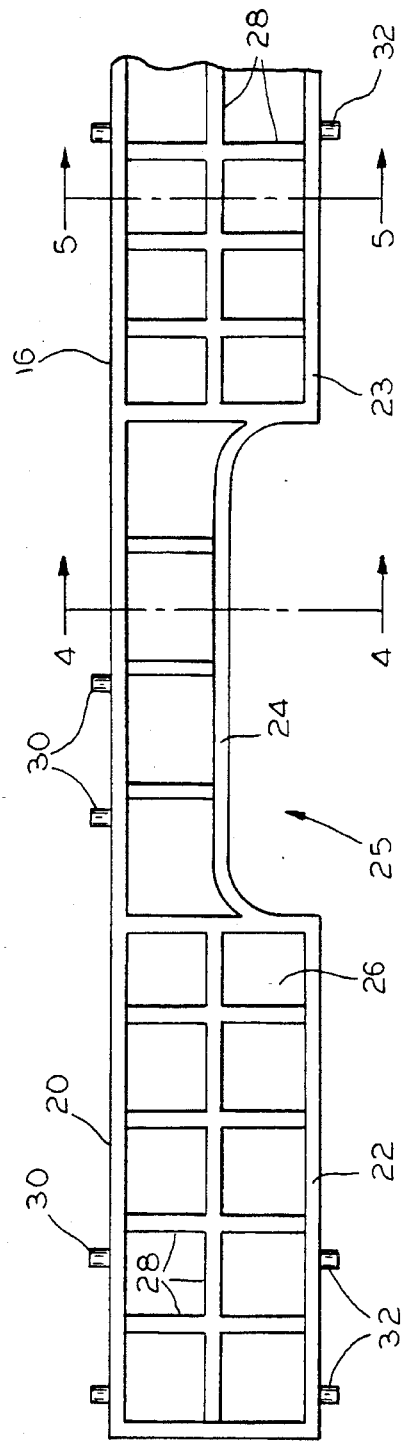

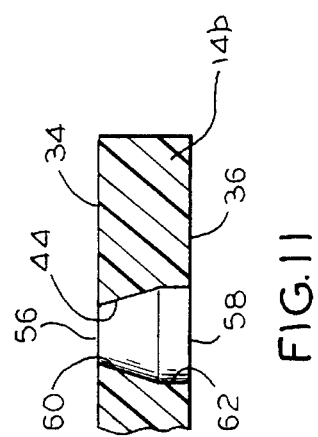
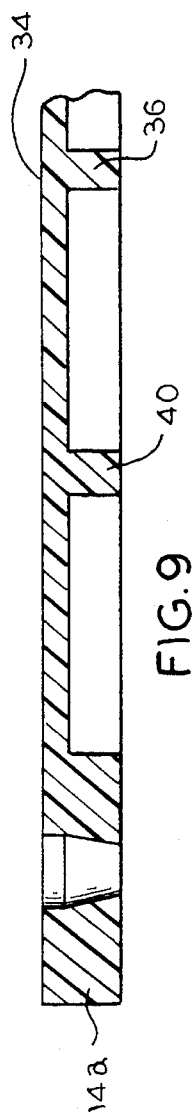
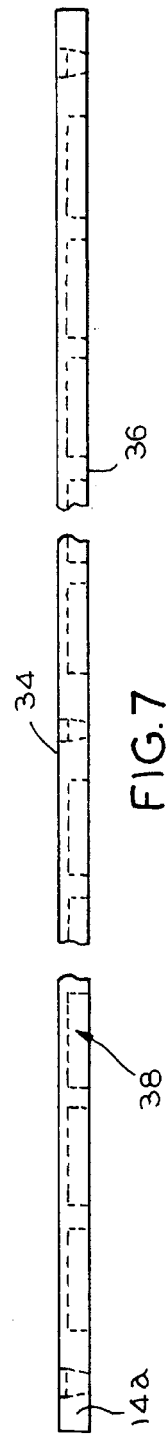
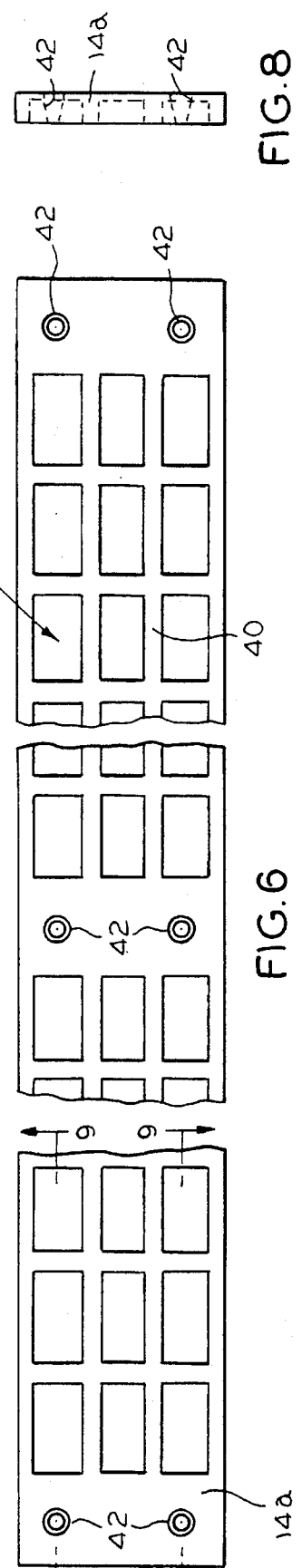

PLASTIC SKID AND METHOD OF MANUFACTURE

This application is a continuation-in-part of Ser. No. 08/014,209 filed Feb. 5, 1993.

BACKGROUND OF THE INVENTION

1. Technical Field

The present invention is directed toward the shipment of goods, and more particularly toward a skid for storing and shipping goods.

2. Background Art

A skid (or pallet) is used to store and ship an upright stack of goods. A skid rests on a generally horizontal support surface and has an upper surface engageable with the bottom of a stack of goods. The upper surface of a skid is upwardly offset from a support surface to facilitate shipment of the skid and the goods thereon. Particularly, the underside of a skid typically has a channel for receiving the tines of a conventional forklift or similar lifting device so the skid easily can be moved.

Large volumes of goods are stored and shipped on skids. It thus is more generally desirable for a skid to be easily and inexpensively manufactured (due to the number of skids required). Acceptable durability of a skid also is desirable in order to sustain the service life of a skid and preclude the necessity of purchasing a replacement skid. Further, it is preferred to minimize the weight of a skid to facilitate handling of a skid and permit an increased volume of goods to be shipped without exceeding the weight limitations of a vehicle in which the goods and skids are to be transported.

Many types of skids for storing and shipping goods are known. Naturally, skids have some common features. For example, it is typical for a skid to have substantially perpendicular spaced apart structural members. A skid commonly has lower structural members which extend in a first direction and which are adapted to rest on a support surface. Upper structural members rigidly secure the lower structural members and define a load engaging surface on the skid spaced above the support surface.

Despite the recognized commonalities, however, many types of skids have been proposed for satisfying the needs expressed above.

For instance, some skids are made of wood. Skids made of wood have generally flat slats fastened (such as by nailing or screwing) to opposite faces of elongate beams. Wood skids weigh approximately 60–65 pounds each. Wood skids also absorb water (for instance, when the skids are subjected to rain or snow) and thereafter become significantly heavier and difficult to handle. Broken components in a wood skid generally must be discarded and replaced, thereby contributing to the escalating problem of waste disposal.

Skids also are made of vacuum formed plastic. The process of vacuum forming a skid requires the heating of thick sheets of plastic and applying a vacuum to draw the melted plastic around a form. This approach has proved prohibitively expensive.

Additionally, skids are made of extruded plastic "lumber". Although extruded plastic skids generally are manufactured more inexpensively than vacuum formed skids, the weight of the mount of extruded plastic required to manufacture a skid having adequate strength characteristics is unacceptably large.

SUMMARY OF THE INVENTION

It is an object of the present invention, therefore, to provide a new and improved skid for storing and shipping goods.

In the exemplary embodiment, a plastic skid has longitudinally extending rails and cross members which extend transversely between the rails. The rails and the cross members are made of injection molded plastic and are secured together to collectively define a cargo engaging surface on the skid.

The rails have an upper flange which is engageable with cargo to be supported on the skid and a lower flange which is engageable with a support surface. Each rail has a width characterized by the width of the upper flange and the lower flange. An integral longitudinal web extends between the upper flange and the lower flange and has a width which is substantially less than the width of the rail. An integral rib is provided on the web for enhancing the stiffness of the rail.

The cross members are positioned on opposite sides of the rails. Each cross member has a pair of spaced apart substantially parallel surfaces. A void is provided in one of the surfaces on the cross members to reduce the weight of the cross member. Each cross member has an integral rib for increasing the stiffness of the cross member.

In order to integrally connect the cross members to the rails, the cross members have a plurality of openings and the rails have a plurality of integral posts. Each post is engageable with a corresponding one of the cross member openings when the skid is in an assembled condition. The posts are ultrasonically welded to the cross members within the corresponding opening.

Further, each cross member has an outer surface facing away from the rails and an inner surface facing toward the rails. The cross member openings are tubular passages which extend between the inner surface and the outer surface. The passages have a peripheral wall tapered such that an axial cross section of the passage increases toward the outer surface of a cross member. The posts deform when they are heated and thereby engage the tapered peripheral sidewall of a cross member opening to lock a cross member to the rails. A plug is positioned in the outlet of each passage to conceal from view a post received in the passage.

In an alternative embodiment, the cross members have a plurality of openings and the rails have a plurality of integral posts. Each post has a threaded end receivable in a corresponding one of the cross member openings. A nut larger the cross member openings has an internally threaded bore for engagably receiving a threaded post end received in a cross member opening and securing the cross member to the rail.

The nut is made of injection molded high-strength engineering resin and is substantially harder than the runners. The nut has a plurality of teeth engageable with a runner when the nut is tightened on a post for preventing disengagement of the nut from the skid. A wrench fitting on the nut receives a tool suitable for rotating the nut and engaging the :nut with a threaded post end. The wrench fittings permit rotation of the nut in only one direction to deter disassembly of the skid. An alternative form of a lock nut has a bore which extends only partially through the nut whereby the end of a post end is hidden from view when the post is received in the bore.

BRIEF DESCRIPTION OF THE DRAWINGS

The features of this invention which are believed to be novel are set forth with particularity in the appended claims. The invention, together with its objects and advantages, may be best understood by reference to the following description taken in conjunction with the accompanying drawings, in which like reference numerals identify like elements in the figures and in which:

FIG. 2 is an enlarged partial perspective view of the skid of FIG. 1;

FIG. 3 is a side view of a rail in the skid of FIGS. 1–2;

FIG. 4 is a sectional view taken along line 4—4 of FIG. 3;

FIG. 5 is a sectional view taken along line 5—5 of FIG. 3;

FIG. 6 is a bottom plan view of a cross member in the skid of FIGS. 1–2;

FIG. 7 is a view of the cross member of FIG. 6;

FIG. 8 is an end view of the cross member of FIG. 6;

FIG. 9 is an enlarged sectional view taken along 9—9 of FIG. 6;

FIG. 10 is a partial sectional view of an upper cross member in the skid of FIG. 1;

FIGS. 11 partial sectional view of a bottom cross member in the skid of FIG. 1;

FIG. 12 is a sectional view showing a post received in an opening in a cross member before the post is welded;

FIG. 13 is a sectional view similar to FIG. 12 after the post is welded;

FIG. 14 is an enlarged exploded view of the skid of FIG. 2;

DESCRIPTION OF THE PREFERRED EMBODIMENT

Figure 1:
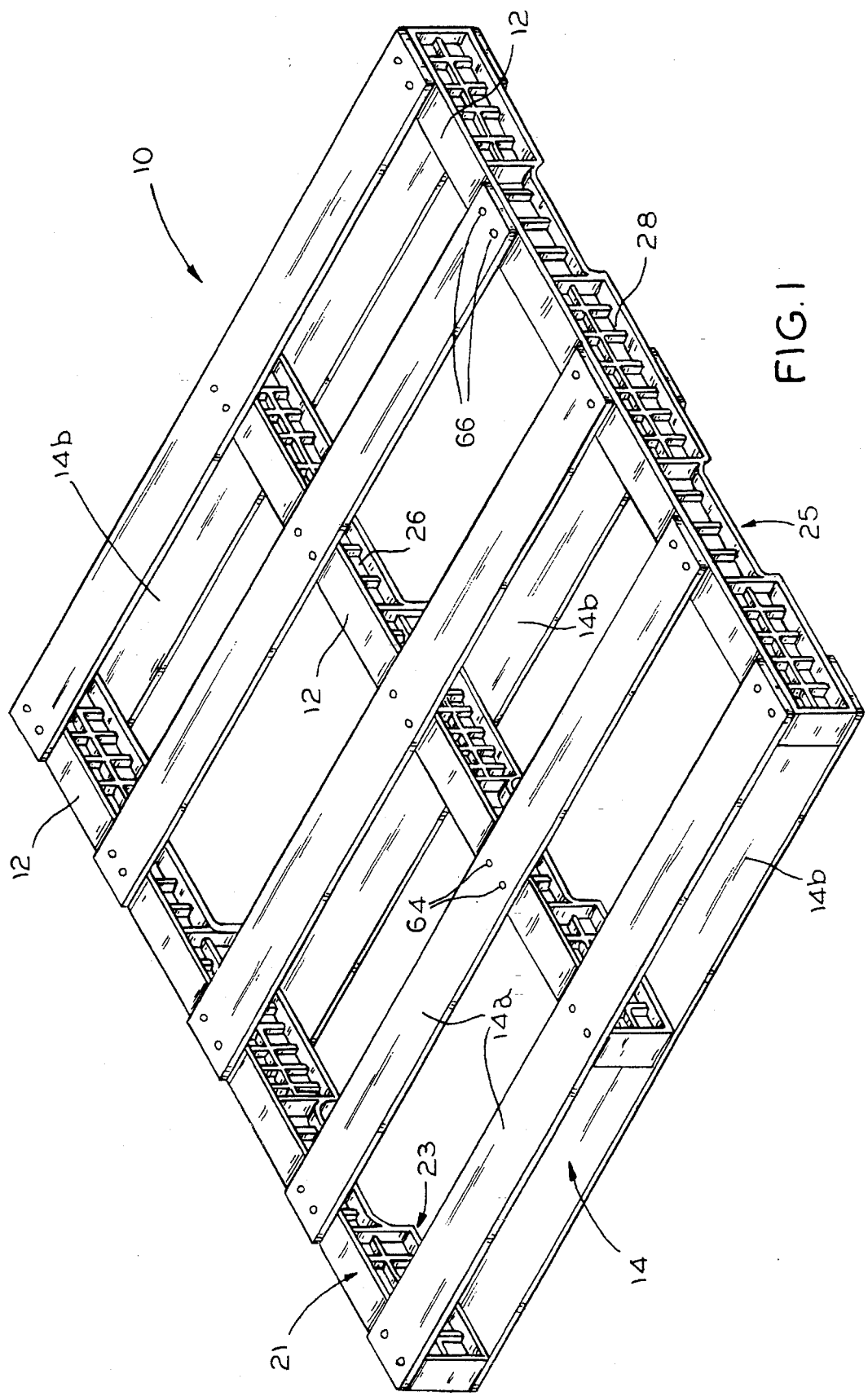
FIG. 1 is a perspective view of a plastic skid according to the invention.

FIG. 1 illustrates a plastic skid according to the present invention, generally designated 10, for storing and shipping a generally upright stack of goods. The skid 10 has a plurality of substantially parallel longitudinally extending rails 12 and a plurality of cross members or runners 14 which extend transversely between the rails 12. In an assembled condition (FIG. 1) of the skid 10, the rails 12 and the runners 14 are integrally connected together, as described below. Runners 14a on an upper side of the rails 12 collectively define a cargo engaging face on the skid 10 and runners 14b on a bottom side of the rails 12 are engageable with a support surface on which the skid 10 is positioned.

The rails 12 and the runners 14 are made of injection molded thermoplastic resin, such as polyethylene, polypropylene, or mixed post consumer plastic regrind. In addition to thermoplastic resin, the injected composition from which the rails 12 and the runners 14 are molded can contain recycled paper products, such as ground newspaper. A structural foaming agent also can be added to the composition to enhance the rigidity of the resulting structure.

As shown in FIG. 2, and in greater detail in FIGS. 3–5, each rail 12 has a flange 20 with an upper surface 21 for supporting the runners 14 and cargo to be stored thereon. Each rail 12 also has an opposite flange 22 with a bottom surface 23. The rails 12 have a width $W_1$ characterized by the width of the upper flange 20 and the lower flange 22. The upper flange 20 extends in a generally straight path lengthwise of the rail 12. The lower flange 22 has spaced apart sections 24 which deviate from a straight path and define a series of channels 25 on the skid 10. As is generally understood by one having ordinary skill in the art, the channels 25 are adapted to receive the fines of a conventional forklift or similar lifting device to facilitate moving the skid 10.

Each rail 12 has an integral longitudinal web 26. The web 26 extends between the upper flange 20 and the lower flange 22 and has a width $W_2$ which is substantially less than the width $W_1$ of the rail 12. A network of intersecting ribs 28 are integral with the web 26 and serve to enhancing the stiffness of the rail 12. The ribs 28 have a width $W_3$ which is less than the width W of the rail 12. A series of pairs of aligned posts 30 are integral with the tipper flange 20 of the rail 12, while a series of pairs of aligned posts 32 are integral with the bottom flange 22 of the rail 12.

The construction of the runners 14 is illustrated in FIGS. 6–11 wherein it can be seen that each runner 14 has a top surface 34 and a mutually parallel bottom surface 36. Referring also to FIGS. 1 and 2, the bottom surface 26 of the runners 14a engages the upper surface 21 of the rails 12, and the top surface 34 of the runners 14b engages the bottom surface 23 of the rails 12. A void 38 is provided in the bottom surface 36 of the runners 14 and reduces the weight of the runners. A network of intersecting ribs 40 are integral with the underside of the runners 14 and partition the void 38 into a plurality of generally rectangular cells. The ribs 40 serve to enhance the stiffness of the runners 14.

Each of the runners 14a and 14b has a series of pairs of aligned openings 42 and 44, respectively.

Each opening 42 in the upper runner 14a comprises a generally tubular passage which extends between an inlet 46 on the bottom surface 36 of the runner 14a and an outlet 48 on the top surface 34 of the runner 14a. The opening 42 has a tapered peripheral wall 50, see FIG. 10, constructed such that the axial cross section of the opening 42 increases toward the top surface 34. The opening 42 has a substantially cylindrical peripheral wall 52 at the outlet 48.

Each opening 44 in the bottom runner 14b comprises a generally tubular passage which extends between an inlet 56 on the top surface 34 of the runner 14b and an outlet 58 on the bottom surface 36 of the runner 14b. The opening 44 has a tapered peripheral wall 60, see FIG. 11, constructed such that the axial cross section of the opening 44 increases toward the bottom surface 36. The opening 44 has a substantially cylindrical peripheral wall 62 at the outlet 58.

The openings 42 in the upper runners 14a and the openings 44 in the lower runners 14b advantageously are constructed such that the runners 14a and 14b are manufactured in the same mold. That is, by reversing the draft of a die inserted in the injection mold, both the upwardly flared openings 42 and the downwardly flared openings 44 can be produced with the same mold.

The manner in which the rails 12 are integrally connected to the runners 14a and 14b now will be described.

Referring first to FIG. 12, the posts 30 on the upper surface 21 of a rail 12 each are snap fit into the inlet 46 of a corresponding one of the openings 42 in a runner 14a. The bottom surface 36 of a runner 14a directly engages the upper surface 21 of the rail 12. Similarly, the posts 32 on the bottom surface 23 of a rail 12 each are snap fit into the inlet 56 of a corresponding one of the openings 44 in a runner 14b. The top surface 34 of a runner 14a directly engages the bottom surface 23 of the rail 12.

Once the runners 14a and 14b are mounted on the posts 30 and 32, respectively, the runners 14a and 14b are integrally connected to the rails 12 by welding the posts 30 and 32 to the runners 14a and 14b, respectively. Particularly, the posts 30 and 32 are melted, such as by the use of an ultrasonic welder, shown generally at 63 in FIG. 12. The ultrasonic welder 63 can be, for example, of the hand-held type manufactured by Branson Ultrasonics Corporation, Danbury, Conn., and has a converter 64 coupled to a horn 65. The converter 64 converts high frequency electrical energy to mechanical vibrations at an ultrasonic frequency. The horn 65 is an acoustic tool which is lowered over the posts 30 and 32 and transfers vibratory energy directly to the parts being assembled.

Particularly, vibrations are transmitted to the posts 30 and 32. Vibratory energy transferred by the horn 65 is converted to heat which melts the posts 30 and 32. When a molten state is reached at the interface between the posts 30 and 32 and the runners 14a and 14b, respectively, vibration is stopped and pressure is applied while the molten plastic solidifies. A weld is achieved between the runners 14a and 14b and the rails 12 when the molten plastic solidifies.

The geometry of the peripheral walls 50 and 60 in the openings 42 and 44, respectively, provide an important function. As shown in FIG. 13, axial pressure is applied to the posts 30 and 32 when the posts 30 and 32 are melted so that the plastic material flows toward the rail 12 and fills the inlets 46 and 56, respectively. The solidified plastic material conforms to the taper of the walls 50 and 60 and serves to lock the runners 14a and 14b, respectively, to the rail 12. A generally cylindrical plug 64 (see also FIG. 14) is inserted into each of the outlets 48 and 58 and conceals the posts 30 and 32, respectively, from view.

The disclosed skid 10 is used for storing and shipping goods. The use of injected molded plastic in the rails 12 and the runners 14 provides a number of important advantages. The process of injection molding is significantly less costly than other plastic manufacturing techniques, such as vacuum molding. Recycled materials, such as ground newspaper, can be utilized in the composition injected into a mold. In addition, foaming agents can be added to the composition to enhance the structural integrity of the rails 12 and the runners 14.

The injection molding process facilitates the manufacture of the integral fibs 28 and 40 in the rails 12 and the runners 14, respectively. Ribs strengthen the structure in which the ribs are formed so that the structure can have a reduced thickness and maintain the strength of a structure which has a greater thickness. A reduced part thickness reduces the weight and cost of a skid 10 by decreasing the amount of material required to manufacture the part. For instance, injection molded plastic skids which provide the strength of a 60 pound wood skid and yet weighs approximately 20–25 pounds.

The plastic skid 10 has favorable durability characteristics and does not absorb water. In the event that the skid 10 cracks or becomes otherwise unusable, the skid 10 can be ground and re-manufactured in an injection mold. The skid 10 thus is 100% recyclable and environmentally efficient.

The integral connection between the rails 12 and the runners 14 provides a structurally sound, unitary skid. In addition, the rails 12 and the runner 14 advantageously can be shipped to a purchaser in a disassembled state and, with the use of a portable welding apparatus, a skid 10 can be manufactured on demand. Thus, it is unnecessary to store assembled skids for which no immediate need exist. The disclosed ease of assembly therefore reduces the amount of spaced required to transport and store a skid before the skid is used.

Figure 15:
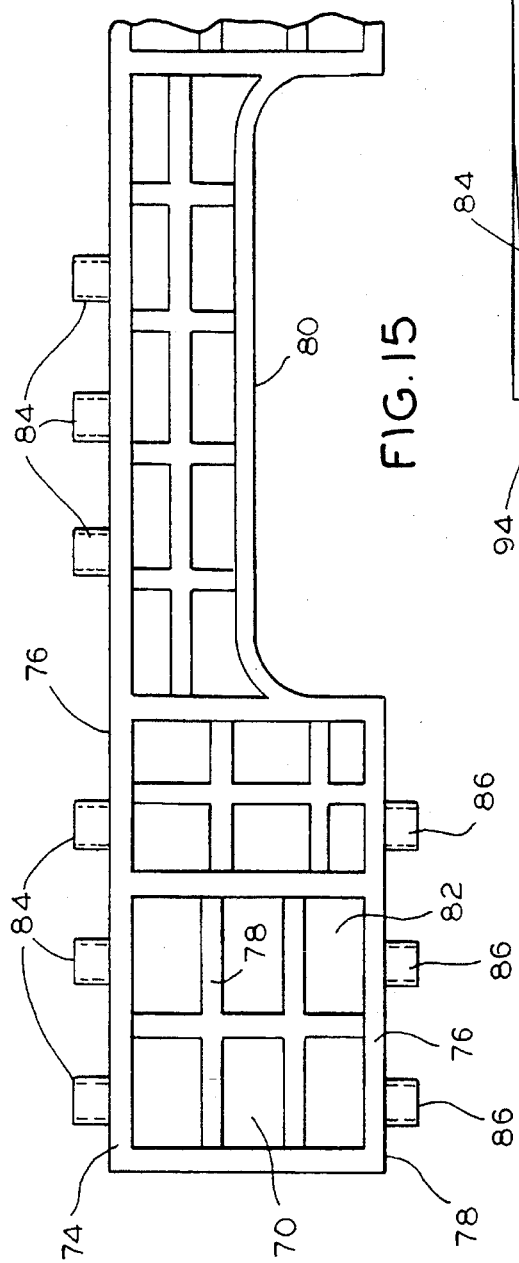
FIG. 15 is a side view of an alternative embodiment of a rail.
Figure 17:
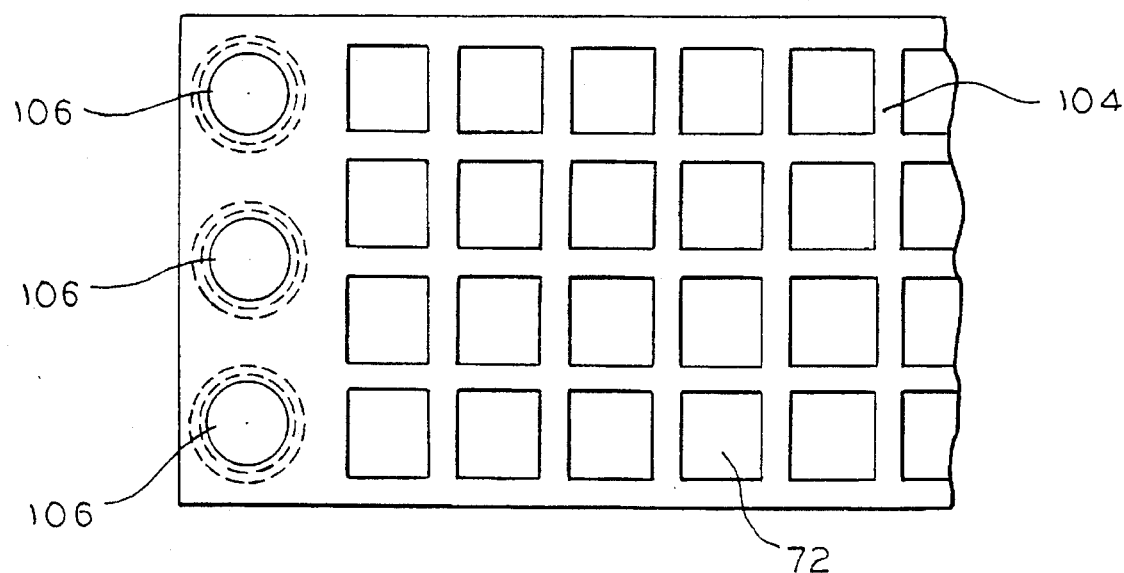
FIG. 17 is a bottom plan view of an alternative embodiment of a cross member.

An alternative connection between components in a plastic skid is achieved in a skid having a plurality of rails 70 (one shown in FIG. 15) and a plurality of runners 72 (one shown FIG. 17) for transversely joining the rails 70. With exception for the manner in which the rails 70 and the runners 72 are connected with each other, the rails 70 and the runners 72 are generally similar to the rails 12 and the runners 14, respectively. That is, the runners 72 connect to opposite sides of the rails 70 and collectively define a cargo engaging face on one side of a skid and a support surface engaging face on an opposite side of the skid.

Each rail 70 has a flange 74 with an upper surface 76 for supporting the runners 72 and cargo to be stored thereon. Each rail 70 also has an opposite lower flange 76 with a bottom surface 78. The lower flange 76 deviates from a straight path and defines a series of forklift receiving channels 80 spaced lengthwise along the skid 10. An integral longitudinal web 82 extends between the upper flange 74 and the lower flange 76 and has a network of integral stiffening ribs 78.

Groups of three aligned posts 84 are integral with the upper flange 74 of the rail 70, and groups of three aligned posts 86 are integral with the bottom flange 76 of the rail 70. The groups of three posts 84 / 86 are spaced lengthwise along the rail 70 and are provided in sufficient number to attach a desired number of runners 72 to a skid, as described hereafter.

Figure 16:
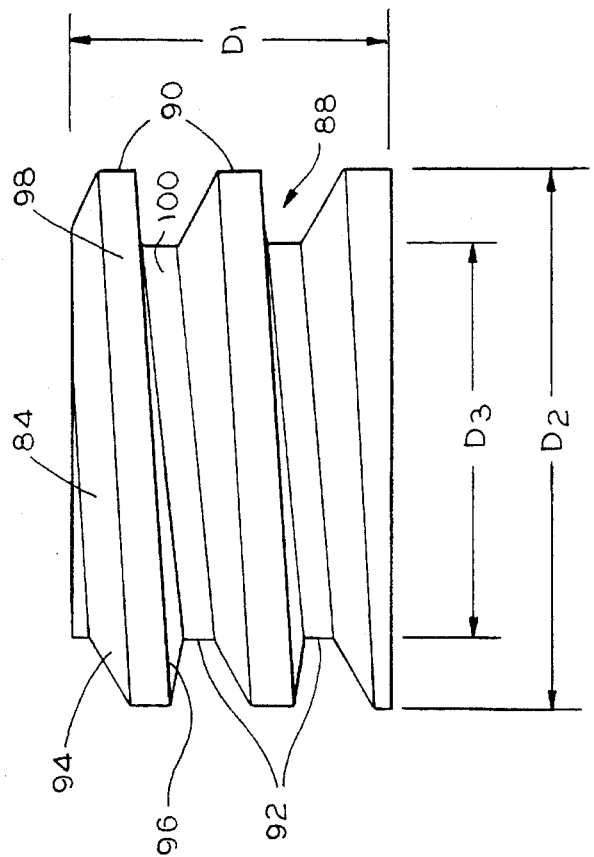
FIG. 16 is an enlarged side view of a post on the rail of FIG. 15.

The construction of the posts 84/86 is illustrated in greater detail in FIG. 16 with specific reference to an exemplary post 84, although it is to be understood that the present invention contemplates that the posts 84 and 86 have a substantially identical construction which can be readily ascertained from the teachings of FIG. 16.

More particularly, the posts 84 are generally cylindrical and have a helical continuous thread, generally designated 88. The helical thread 88 extends axially along the exterior of the post a distance D 1 and defines an alternating series of pitched lands 90 and grooves 92. It is preferred that the distance D 1 is in the range of about 0.35 to about 0.5 inches, and in the exemplary embodiment the distance D1 is about 0.415 inches.

The helical thread 88 has a pair of oppositely sloped sidewalls 94 and 96 which spiral around the post 84. The sidewalls 94 and 96 terminate at an outer axial wall 98 whereby the lands 90 define an outside diameter D2 on the post 84. In a preferred embodiment, the diameter D2 is in the range of about 0.6 to about 0.75 inches, and in the exemplary embodiment the diameter D2 is about 0.68 inches.

The sidewalls 94 and 96 terminate at an inner axial wall 100 whereby the grooves 92 define an inside diameter D3 on the post 84. In a preferred embodiment, the diameter D3 is in the range of about 0.4 to about 0.6 inches, and in the exemplary embodiment the diameter D3 is about 0.5 inches.

Figure 18:
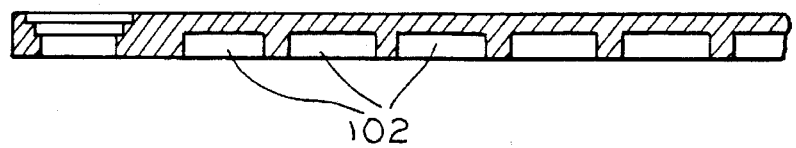
FIG. 18 as a side view of the cross member of FIG. 17.
Figure 19:
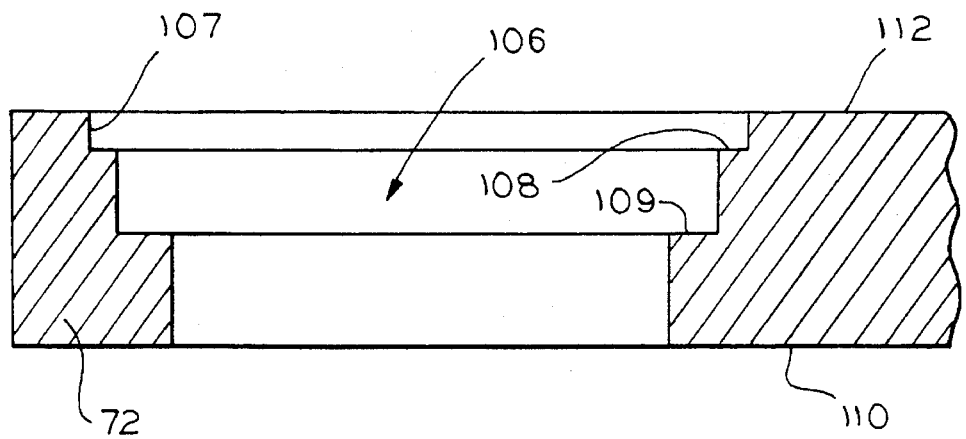
FIG. 19 is an enlarged sectional view taken along 19—19 of FIG. 18.

The runners 72 attach to opposite sides of the rails 70 and have a plurality of weight reducing voids 102 (see also FIG. 18) and a network of integral stiffening ribs 104. Each runner 72 has a series of openings 106 aligned in groups of three for receiving a group of three posts 84 when the runner 72 is attached to the upper side of a rail 70 and, alternatively, for receiving a group of three posts 86 when the runner 72 is attached to the lower side of the rail 70. Each opening 106 in a runner 72 comprises a generally tubular passage having a stepped peripheral wall 107 (see FIG. 19) constructed such that the axial cross section of the opening 106 has three discrete diameters increasing from an inner mounting side 110 of the runner 72 to an outer side 112 of the runner 72. The stepped wall 107 defines a pair of axially spaced annular seats 108 and 109 in the opening 106. In the exemplary embodiment, the thickness of the rails 72 (and thus the height of the openings 106) is approximately 0.425 inches.

Figure 20:
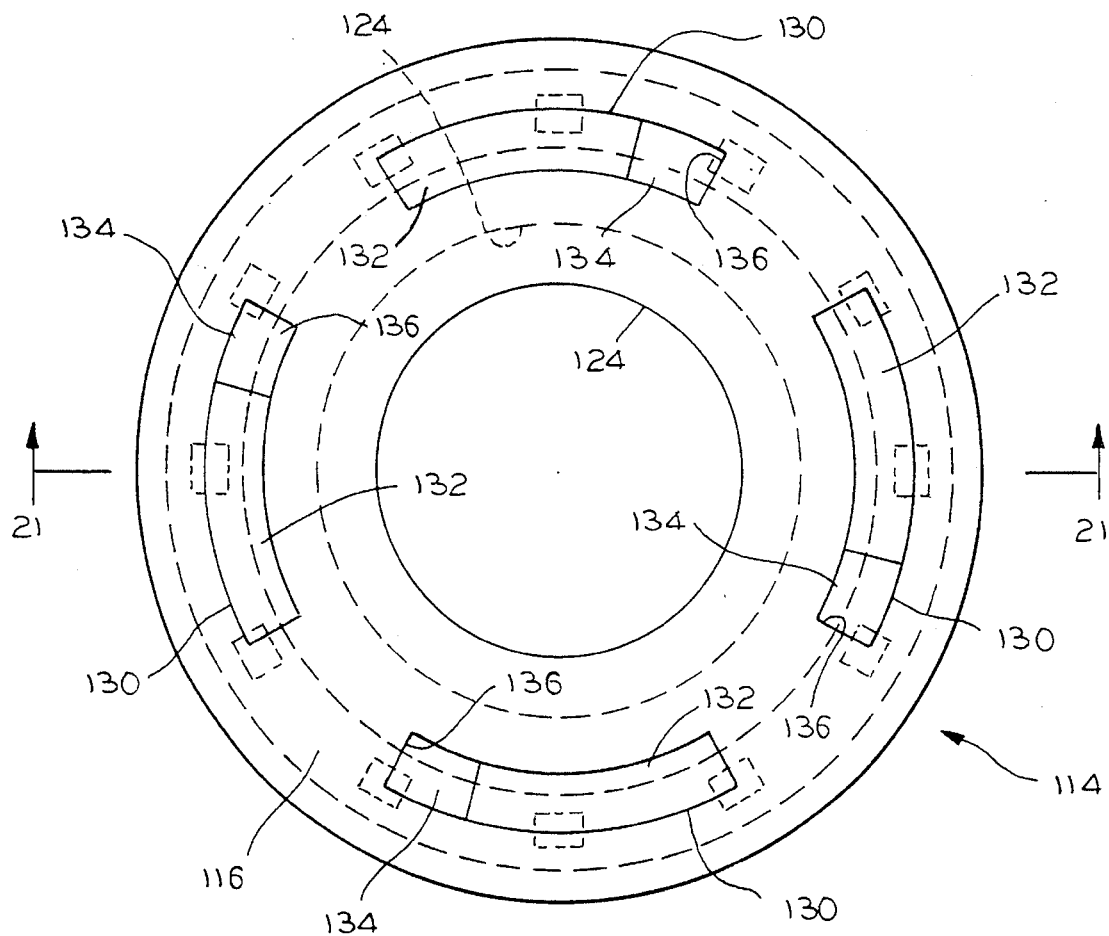
FIG. 20 is a top plan view of a lock nut.
Figure 21:
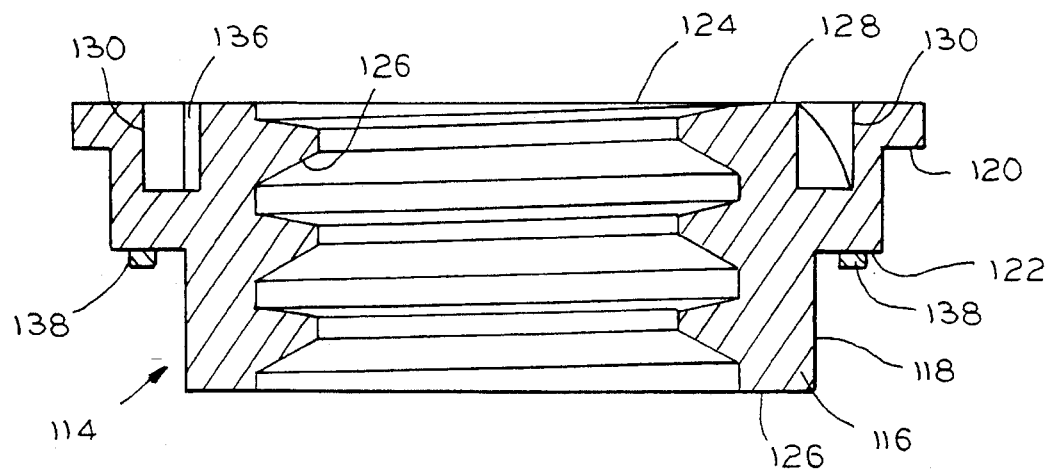
FIG. 21 is an enlarged sectional view taken along 21—21 of FIG. 20.
Figure 22:
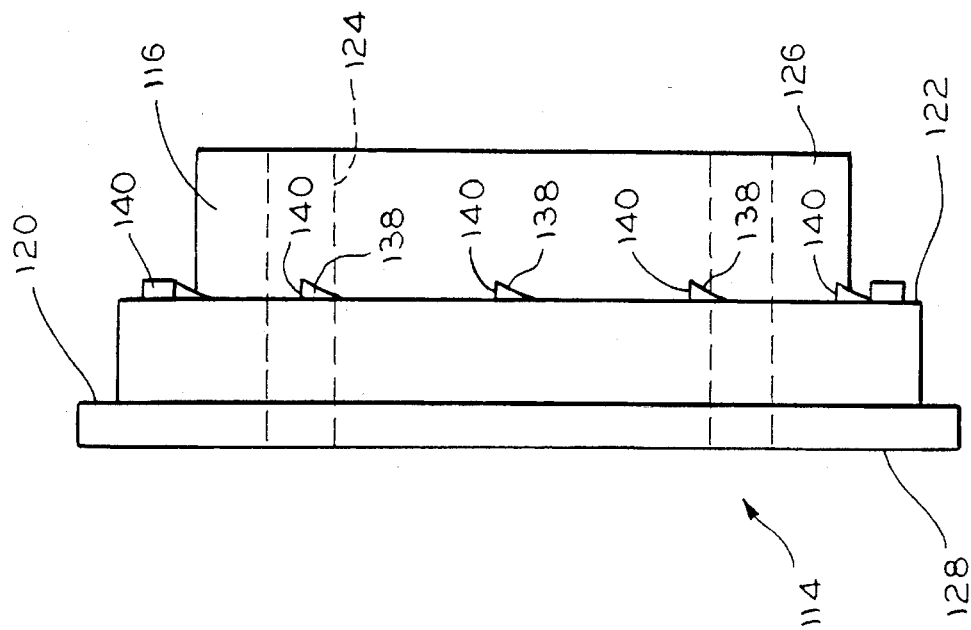
FIG. 22 is a side view of the lock nut of FIG. 20.

A lock nut, generally designated 114 in FIGS. 20–22, secures each one of the posts 84/86 in a respective one of the runner openings 106. More particularly, the lock nut 114 has a generally tubular body 116 with a stepped sidewall 118 defining a pair of axially spaced annular flanges 120 and 122 on the body 116. A bore 124 extends axially between an inner end 126 and an outer end 128 of the lock nut 114 and has an integral thread 126 complementary to the helical thread 88 on the posts 84/86.

Four circumferentially spaced arcuate wrench firings 130 communicate with the outer end 128 of the body 116. Each wrench fitting 130 has a ramp 132 which tapers gradually downward in a clockwise direction as viewed in FIG. 20. A flat 134 is smoothly integrated with the lower end of each respective ramp 132 and terminates at an axial end wall 136.

A series of teeth 138 are spaced around the annular flange 122 and have a generally ramped profile (FIG. 24), which is to say that the teeth 138 taper downwardly away from the flange 122 in a counter-clockwise direction as viewed in FIG. 20. The lock nut body 116 and thus the integral teeth 138 are fabricated of a high-strength engineering resin substantially harder than the plastic from which the rails 70 and the runners 72 are manufactured.

A runner 72 is connected to a rail 70 by inserting three posts 84/86 on a rail 70 into the aligned openings 106 on the runner 72. A lock nut 114 is placed over each of the posts 84/86 when the posts 84/86 are fully received in the openings 106 and a wrench or other suitable assembly tool (not shown) is lowered into the fittings 132 for tightening the lock nuts 114. The ramped construction of the wrench fittings 132 facilitates tightening of the fittings by permitting the wrench to gradually lower into a respective fitting as the wrench is rotated in a clockwise direction (as viewed in FIG. 20). Clockwise rotation of the wrench is limited by the axial wall 136, whereby continued rotation of the wrench causes the lock nut 114 to rotate and advance along the post 84/86 due to cooperation of the threaded bore 124 in the nut 114 and the helical thread 88 on the post 84/86.

Each lock nut 114 is tightened until the annular flanges 120 and 122 on the lock nut body 116 are fully seated on the annular seats 108 and 109, respectively, in a runner opening 106. Moreover, the teeth 138 on the flange 122 engage the seat 109 in the opening 106 and embed into the runner 72 when the lock nut 114 is tightened due to the relative hardness of the high-strength resin from which the teeth 138 are fabricated. The direction in which the teeth 138 are ramped (that is, downward counter-clockwise) defines an axial wall 140 on each tooth that resists counter-clockwise rotation of an installed lock nut 114 and positively locks the rail 70 to a runner 72.

Figure 23:
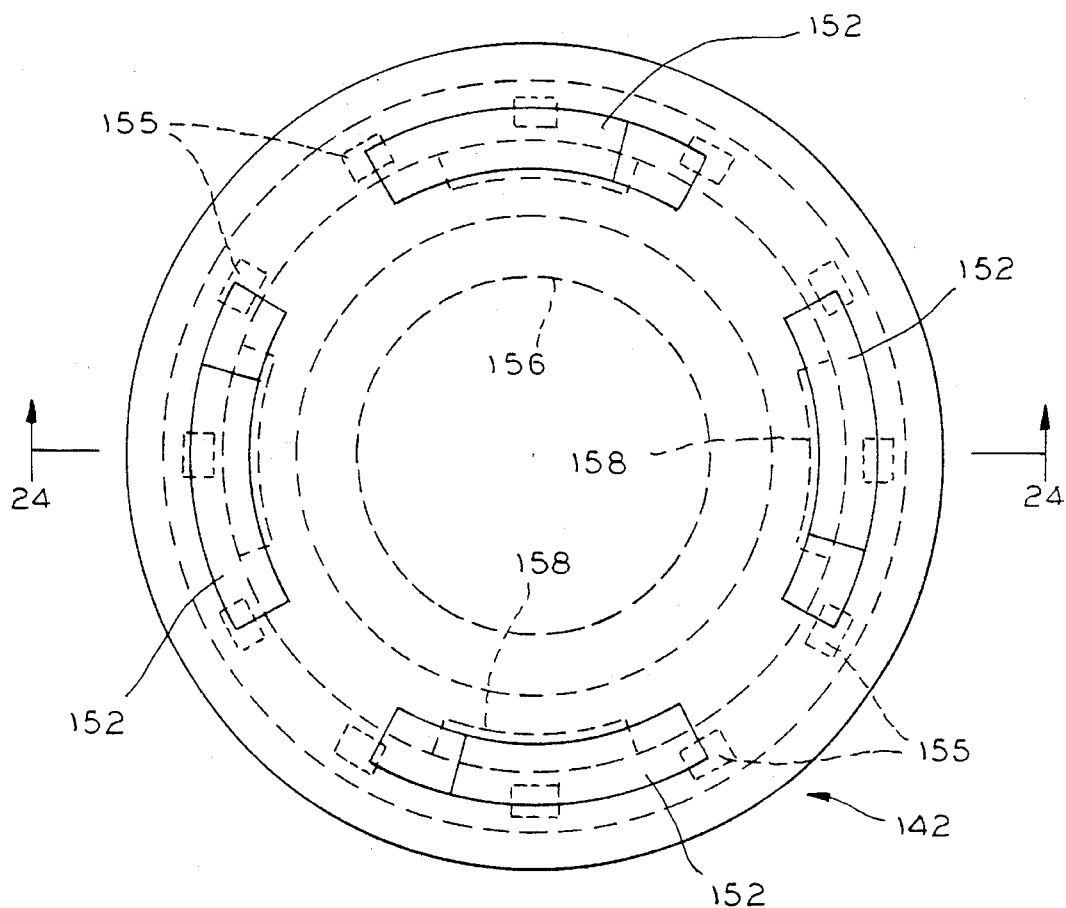
FIG. 23 is a top plan view of an alternative lock nut.
Figure 24:
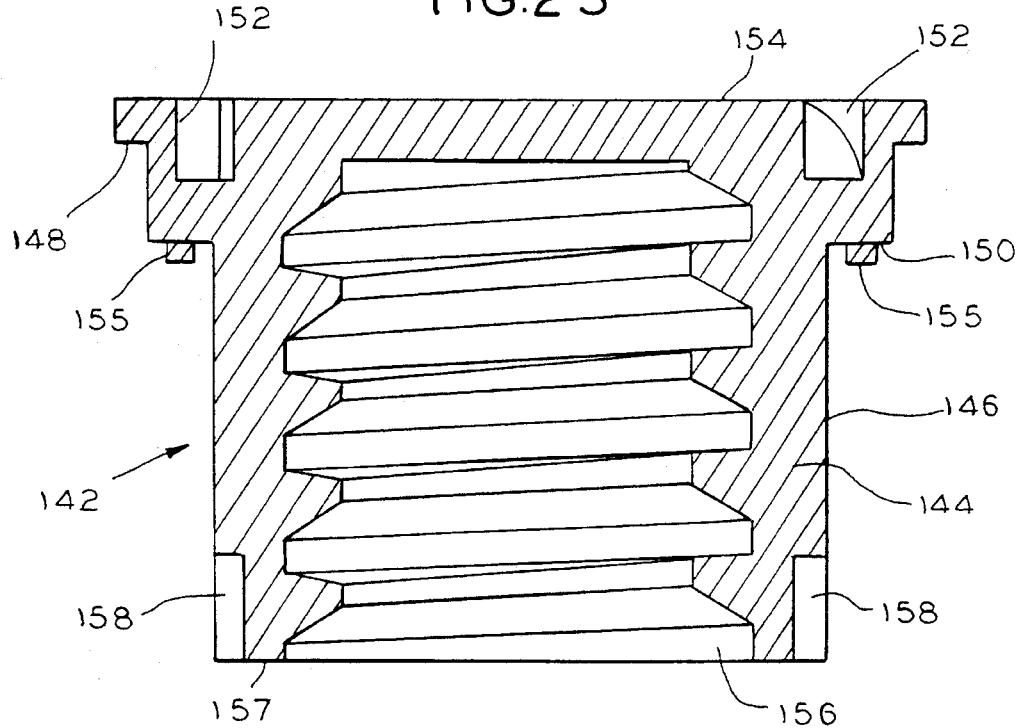
FIG. 24 is an enlarged sectional view taken along 24—24 of FIG. 23.
Figure 25:
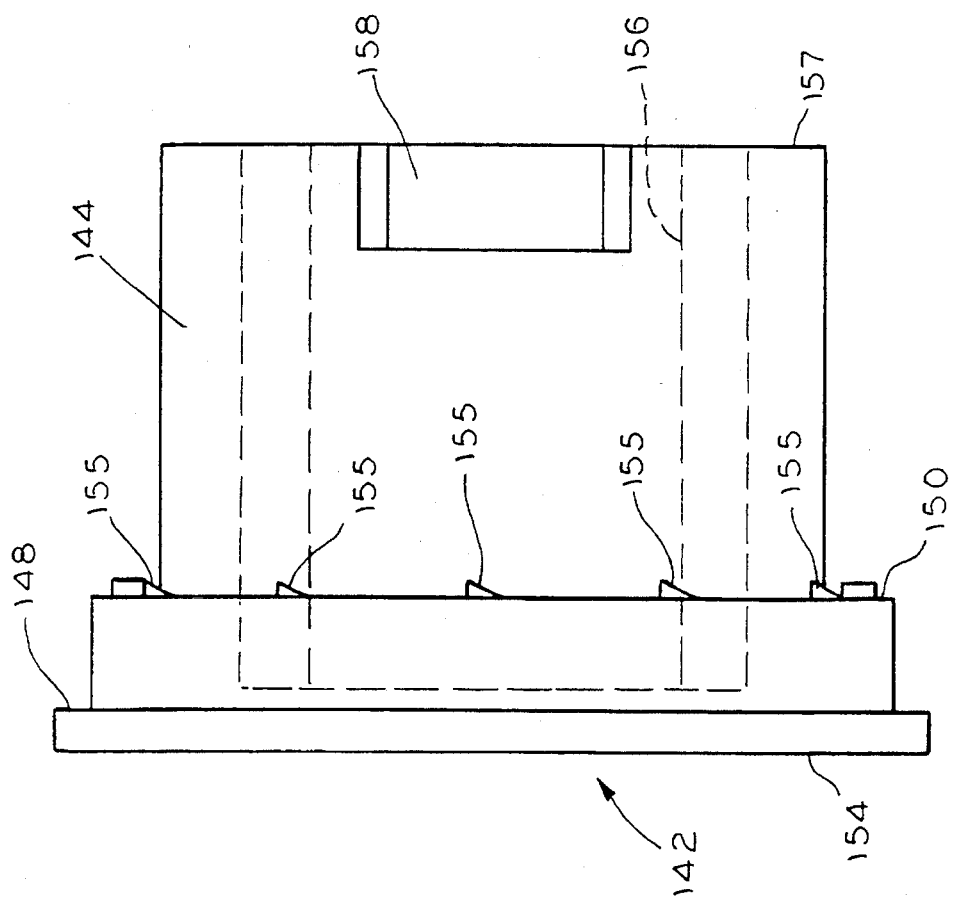
FIG. 25 is a side view of the alternative lock nut of FIG. 23.

An alternative lock nut is generally designated 142 in FIGS. 23–25 and, in the exemplary embodiment, is intended for use with a plastic pallet having rails 72 which are approximately 0.85 inches thick and with runners 70 having posts 84/86 which are approximately 0.7 inches long.

In many respects, the lock nut 142 is similar to the lock nut 114 described above. Specifically, the lock nut 142 has a generally tubular body 144 with a stepped sidewall 146 defining a pair annular seating flanges 148 and 150. A plurality of ramped wrench fittings 152 communicate with an outer end 154 of the body 144. Circumferentially spaced teeth 155 taper away from the seating flange 150 and embed into a runner 72 when the lock nut 142 is tightened.

As best seen in FIG. 25, an internally threaded bore 156 extends partially between an inner end 157 and the outer end 154 of the lock nut 142. The lock nut 142 has a series of undercut arcuate channels 158 spaced around the periphery of the inner end 157. The upper end of a post 84/86 received in the bore 156 is not visible when the lock nut 142 is tightened since the bore 156 does not communicate with the outer end 154 of the lock nut 142.

Still other aspects, objects, and advantages of the present invention can be obtained from a study of the specification, the drawings, and the appended claims.

I claim:

1. A skid comprising:

a pair of longitudinally extending rails, said rails being positionable on a support surface;

a plurality of cross members extending transversely between said rails, at least one of said pair of longitudinal rails or said plurality of transverse cross members being made of injection molded plastic; and means for securing the cross members to the rails so that the rails and the cross members together define a cargo engaging surface on the skid, in which one of said cross members has a plurality of openings and one of said rails has a plurality of integral posts, each post having a threaded end receivable in a corresponding one of said cross member openings, and including a nut larger than said cross member opening and having an internally threaded bore for engageably receiving a threaded post end received in said cross member opening and securing the cross member to the rail.

2. The skid of claim 1 in which said nut is made of injection molded plastic.

3. The skid of claim 1 in which said nut is substantially harder than said cross members.

4. The skid of claim 1 in which the nut has a fitting for receiving a tool suitable for rotating the nut and engaging the nut with a threaded post end, said fitting being adapted to permit rotation of said nut in only one direction.

5. The skid of claim 1 in which the nut has a plurality of teeth engageable with a cross member when the nut is engaged with a post for preventing disengagement of the nut from the skid.

6. The skid of claim 1 in which the bore extends only partially through the nut whereby the end of a post end is hidden from view when the post is received in the bore.

7. In a skid comprising a pair of longitudinally extending rails, said rails being positionable on a support surface, and a plurality of cross members extending transversely between said rails, the improvement comprising:

a plurality of openings on at least one of said cross members;

a plurality of posts integral with at least one of said rails, each post having a threaded end receivable in a corresponding one of said cross member openings; and a plastic nut larger than said cross member opening and having an internally threaded bore for engagably receiving a threaded post end received in one of said cross member openings for securing the cross member to a rail so that the rails and the cross members together define a cargo engaging surface on the skid.

8. The skid of claim 7 in which the nut has a fitting for receiving a tool suitable for rotating the nut and engaging the nut with a threaded post end, said fitting being adapted to permit rotation of said nut in only one direction.

9. The skid of claim 7 in which said nut is substantially harder than said cross members, and the nut has a plurality of teeth engageable with a cross member when the nut is engaged with a post for preventing disengagement of the nut from the skid.

10. The skid of claim 7 in which the bore extends only partially through the nut whereby the end of a post end is hidden from view when the post is received in the bore.

* * * * *